(12) United States Patent
Pomerantz

(10) Patent No.: US 7,630,204 B2
(45) Date of Patent: Dec. 8, 2009

(54) DETACHABLE DEVICE HOLDER

(75) Inventor: Itzhak Pomerantz, Kfar Saba (IL)

(73) Assignee: SanDisk IL Ltd., Kfar Saba (IL)

( * ) Notice: Subject to any disclaimer, the term of this patent is extended or adjusted under 35 U.S.C. 154(b) by 675 days.

(21) Appl. No.: 11/389,224

(22) Filed: Mar. 27, 2006

(65) Prior Publication Data
US 2006/0218119 A1 Sep. 28, 2006

Related U.S. Application Data

(60) Provisional application No. 60/665,272, filed on Mar. 28, 2005.

(51) Int. Cl.
*H05K 7/12* (2006.01)
(52) U.S. Cl. .................. 361/752; 361/737; 361/728; 361/730; 439/131; 439/135; 439/892
(58) Field of Classification Search .......... 361/737, 361/752, 728, 730; 439/131, 135, 136, 139, 439/149
See application file for complete search history.

(56) References Cited

U.S. PATENT DOCUMENTS

| | | | | |
|---|---|---|---|---|
| 4,563,725 A | * | 1/1986 | Kirby | 361/708 |
| 4,648,008 A | * | 3/1987 | Neyroud et al. | 361/706 |
| 5,170,325 A | * | 12/1992 | Bentz et al. | 361/707 |
| 6,465,728 B1 | * | 10/2002 | McLaughlin et al. | 174/16.3 |
| 7,341,464 B2 | * | 3/2008 | Cuellar et al. | 439/135 |
| 7,416,424 B1 | * | 8/2008 | Deckman | 439/135 |
| 7,503,780 B1 | * | 3/2009 | Huang | 439/135 |
| 7,503,801 B2 | * | 3/2009 | Mahieux et al. | 439/521 |
| 7,547,218 B2 | * | 6/2009 | Hiew et al. | 439/135 |
| 2004/0212966 A1 | * | 10/2004 | Fisher et al. | 361/726 |
| 2006/0038023 A1 | * | 2/2006 | Brewer et al. | 235/492 |

* cited by examiner

*Primary Examiner*—Dameon E Levi
(74) *Attorney, Agent, or Firm*—Vierra Magen Marcus & DeNiro LLP

(57) ABSTRACT

A system including a portable object and a portable object holder is disclosed. Preferably, the portable object is an electronic device such as a flash memory drive such as a USB flash drive. According to some embodiments, when the portable object and the portable object holder are attached to each other, the combination is convenient for a user to carry in her pocket. While detached from each other, the portable object holder is retained in a state where the portable object holder is inconvenient for a user to carry in her pocket. Thus, the user may be less likely to forget the electronic device after use, and may be more likely to remember to replace the electronic device in or on the device holder. According to some embodiments, the portable object holder has a first state and a second state. Detachment of the portable object from the portable object holder is operative to cause the device holder to adopt the second state, where at least one dimension of the device holder is increased. Formulae relating lengths of dimensions of rectangular prisms which minimally circumscribe the object holder and/or the portable object in the first and second states are provided In some embodiments, the "inconvenient" nature of the second state may be provided by increased maximum localized contact pressure, for example, due to a localized projection or spike which provides this increased contact pressure only in the second state.

27 Claims, 13 Drawing Sheets

DETACHABLE DEVICE HOLDER

CROSS-REFERENCE TO RELATED APPLICATIONS

This patent application claims the benefit of U.S. Provisional Patent Application No. 60/665,272, filed Mar. 28, 2005 by the present inventor.

FIELD OF THE INVENTION

The present invention relates to systems including electronic devices and device holders.

BACKGROUND

There are electronic devices (for example, non-volatile memory device or flash device) that users carry in their pocket, attached to a device holder (for example, a keyholder), and detach from the device holder in order to use the electronic device. A tropical example is a USB key, that has to be plugged into a computer when used.

People tend to forget such devices when detached (for example, when plugged into the computer). According to one example, a speaker uses a USB flash drive (UFD) to carry his presentation, and upon leaving the conference hall forgets to re-attach the UFD to its holder, thereby forgetting the UFD and risking it reaching wrong hands.

There is an ongoing need for apparatus, systems and method which serve to indicate to a user whether or not the device holder is attached to its holder. This could help remind users to replace the electronic device in or on its device holder after use.

SUMMARY

Some or all of the aforementioned needs, and other needs, may be satisfied by several aspects of the present invention.

It is now disclosed for the first time a system comprising: (a) an electronic device having electronic circuitry and a housing, and (b) a device holder having first and second states. According to some embodiments, (i) the electronic device is reversibly attachable with the device holder, (ii) the device holder is retained in the first state when attached with the electronic device, (iii) detachment of the electronic device from the device holder is operative to cause the device holder to adopt the second state; and (iv) at least one of a first size relation, a second size relation or a third size relation between a first rectangular prism and a second rectangular prism is true.

The aforementioned rectangular prisms may be defined as follows (A) the first rectangular prism is defined to minimally circumscribe the combination of the electronic device and the device holder in the first state while the device holder is attached to said electronic device, (B) the second rectangular prism is defined to minimally circumscribe the device holder in the second state.

According to some embodiments, the size relations may be defined as follows: (I) according to the first size relation, a ratio between a longest dimension of the second rectangular prism and a longest dimension of the first rectangular prism is at least a first value that is at least 1.5; and (II) according to the second size relation, a ratio between a product of the two longer dimensions of the second rectangular prism and a product of the two longer dimensions of the first rectangular prism is at least a second value that is at least 1.5, and a ratio between a second longest dimension of said second rectangular prism and a longest dimension of said rectangular prism is at least a third value that is at least 0.3; and (III) according to said third size relation, a ratio between a volume of said second rectangular prism and a volume of said first rectangular prism is at least a fourth value that is at least 1.5, and a ratio between a shortest dimension of said second rectangular prism and a longest dimension of said rectangular prism is at least a fifth value that is at least 0.3.

According to some embodiments, the electronic device is a flash memory drive.

According to some embodiments, the flash memory drive is a USB flash drive.

According to some embodiments, at least one of the first value, the third value and the fifth value is 1.7.

According to some embodiments, at least one of the first value, the third value and the fifth value is 1.9.

According to some embodiments, at least one of the first value, the third value and the fifth value is 2.

According to some embodiments, at least one of the second value and the fourth value is 0.5.

According to some embodiments, at least one of the second value and the fourth value is 0.7.

According to some embodiments, the device holder is biased towards the second state, and the device holder is temporarily retained in the first state while attached to the electronic device.

According to some embodiments, the electronic device has a plug.

According to some embodiments, the device holder is dimensioned as a cap for the plug.

According to some embodiments, the plug is a USB plug.

According to some embodiments, the electronic device is a USB flash device.

According to some embodiments, the device holder includes an aperture dimensioned to accept a key ring.

According to some embodiments, the device holder has a receptacle dimensioned to accept the plug.

According to some embodiments, insertion of the plug into the receptacle is operative to cause the device holder to adopt the first state, and removal of the plug from the receptacle is operative to cause the device holder to adopt the second state.

It is now disclosed for the first time a system comprising:
a) an electronic device having electronic circuitry and a housing;
b) a device holder reversibly attachable with the electronic device, the device holder having first and second states, the first state being configured such that the combination of the electronic device attached to the device holder is convenient to place in a pocket, the second state being configured such that the device holder detached from the electronic device is inconvenient to place in a pocket, wherein:
 i) the device holder is retained in the first state when attached with the electronic device;
 ii) detachment of the electronic device from the device holder is operative to cause the device holder to adopt the second state It is now disclosed for the first time a system comprising:
a) an portable object;
b) a portable object holder having first and second states, wherein:
 i) the portable object is reversibly attachable with the portable object holder;
 ii) the portable object holder is retained in the first state when attached with the portable object;

iii) detachment of the portable object from the portable object holder is operative to cause the portable object holder to adopt the second state; and iv) at least one of a first size relation, a second size relation and a third size relation between a first rectangular prism and a second rectangular prism is true, wherein the rectangular prisms are defined as follows:

A) tie first rectangular prism minimally circumscribing the combination of the portable object and the portable object holder in the first state while the device is attached to the portable object, B) the second rectangular prism minimally circumscribing the portable object holder in the second state and wherein the size relations are defined as follows:

I) according to the first size relation, a ratio between a longest dimension of the second rectangular prism and a longest dimension of the first rectangular prism is at least a first value that is at least 1.5; and II) according to the second size relation, a ratio between a product of the two longer dimensions of the second rectangular prism and a product of the two longer dimensions of the first rectangular prism is at least a second value that is at least 1.5, and a ratio between a second longest dimension of the second rectangular prism and a longest dimension of the second rectangular prism is at least a third value that is at least 0.3; and III) according to the third size relation, a ratio between a volume of the second rectangular prism and a volume of the first rectangular prism is at least a fourth value that is at least 1.5 and a ratio between a shortest dimension of the second rectangular prism and a longest dimension of the second rectangular prism is at least a fifth value that is at least 0.3.

It is now disclosed for the first time a system comprising:
a) an portable object;
b) a portable object holder reversibly attachable with the portable object, the portable object holder having first and second states, the first state being configured such that the combination of the portable object attached to the portable object holder is convenient to place in a pocket, the second state being configured such that the portable object holder detached from the portable object is inconvenient to place in a pocket, wherein:

i) the portable object holder is retained in the first state when attached with the portable object;

ii) detachment of the portable object from the portable object holder is operative to cause the portable object holder to adopt the second state.

These and further embodiments will be apparent from the detailed description and examples that follow.

DETAILED DESCRIPTION

Figure 1A:
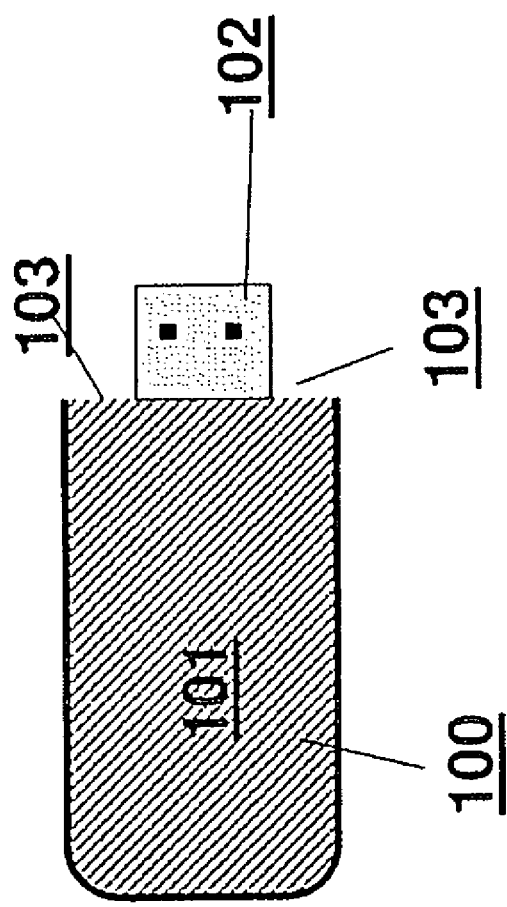
FIG. 1A provides a drawing of an electronic device according to a first embodiment of the invention.
Figure 1A:
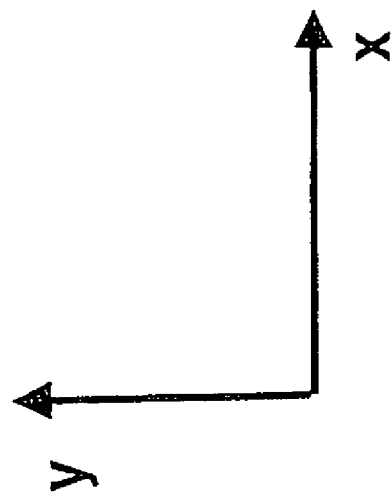

The present invention will now be described in terms of specific, example embodiments. It is to be understood that the invention is not limited to the example embodiments disclosed. It should also be understood that not every feature of the presently disclosed device holder and presently disclosed system including a portable object (for example, an electronic device) and a portable object holder (e.g. a device holder) is necessary to implement the invention as claimed in any particular one of the appended claims. Various elements and features of devices are described to fully enable the invention. It should also be understood that throughout this disclosure, where a process or method is shown or described, the steps of the method may be performed in any order or simultaneously, unless it is clear from the context that one step depends on another being performed first.

The present inventor is disclosing, for the first time, a particular system including a portable object (for example, a portable electronic device) and a portable object holder (for example, an electronic device holder). The device holder has two states: a state where the combination of the portable object holder attached to the portable object is "convenient to place in a user's pocket" and a state where the portable object holder, after being detached from the portable object, expands in at least one dimension to the extent that it is "inconvenient to place in a user's pocket." It is now disclosed that this feature can be useful for helping to remind users to re-attach the portable object to the portable object holder after use, and for reducing a likelihood that a user would forget or lose the portable object.

It is noted that the transition between "convenient to place in a user's pocket" and "inconvenient to place in a user's pocket" may be explained either: (A) in relative size terms (i.e. the relative sizes or dimension(s) of the object and object holder in the "convenient" state versus the "inconvenient state"—this relates to the concept that a user may "feel a size difference" when attaching the object holder to the object and/or detaching the object holder from the object) and/or (B) in terms an increased maximum localized contact pressure, for example, due to a localized or sharp projection of the device holder, which in the inconvenient state may be operative to generate a maximum localized contact pressure that makes the device holder inconvenient to carry in a user's pocket (as defined at the end of this disclosure).

It is noted that these may be independent notions—thus, in some embodiments, the present invention provides device holders which undergo a relative size transition but are not characterized by increased maximum localized contact pressure in the "inconvenient state." In some embodiments, the present invention provides device holders which are characterized by increased maximum localized contact pressure in the "inconvenient state" relative to the "convenient state" (i.e.

as defined below) but do not undergo or exhibit the relative size transition (as defined below in terms of minimally circumscribing rectangular prisms). In some embodiments, the present invention provides device holders which both undergo a relative size transition (as defined below in terms of minimally circumscribing rectangular prisms) and are also characterized by increased maximum contact pressure in the "inconvenient state" relative to the "convenient state." (as defined below).

Although the invention will be explained in terms of the "portable electronic device" and an "electronic device holder" it is appreciated that in other embodiments disclosed herein, portable objects other than portable electronic devices may be provided as part of the object-object holder system. Exemplary such "portable objects" include but are not limited to keys, key holders, and the like, where there may be a motivation to require a user to re-attach a key holder after use, for example, lending a key holder to a friend). Thus, references to and descriptions of a "device holder" and an "electronic device holder" are also applicable to the "portable object holder." Furthermore, references to and descriptions of an "electronic device" are equally applicable to the "portable object" (except for the need for electronic circuitry and a housing for electronic circuitry, which, it will be appreciated, applies to the electronic device and not necessarily to all other portable objects).

Discussion of the Transition Between the Convenient State and the Inconvenient State in Terms of Relative Size First Embodiment FIG. 1A provides a drawing of an exemplary electronic device 100 according to a first embodiment of the invention. As depicted in FIG. 1A, the electronic device 100 includes a housing 101 and a plug 102, which may be useful for physically coupling the electronic device 100 to another electronic device (for example, a host device such as a microcomputer). In the example of FIG. 1A, the electronic device 100 depicted is a USB flash drive having a non-volatile flash memory (i.e. in electronic circuitry residing within the housing 101). The plug 102 is shaped as a USB plug. It is appreciated that the presence of a plug in general, and the USB plug in particular is not a limitation of the present invention. Nevertheless, it is recognized that plugged electronic devices (in particular, non-volatile memory devices such as USB flash devices) are ubiquitous, and the present invention provides a solution for users who may forget to re-engage or re-attached their flash memory devices with the device holder after use.

Figure 1B:
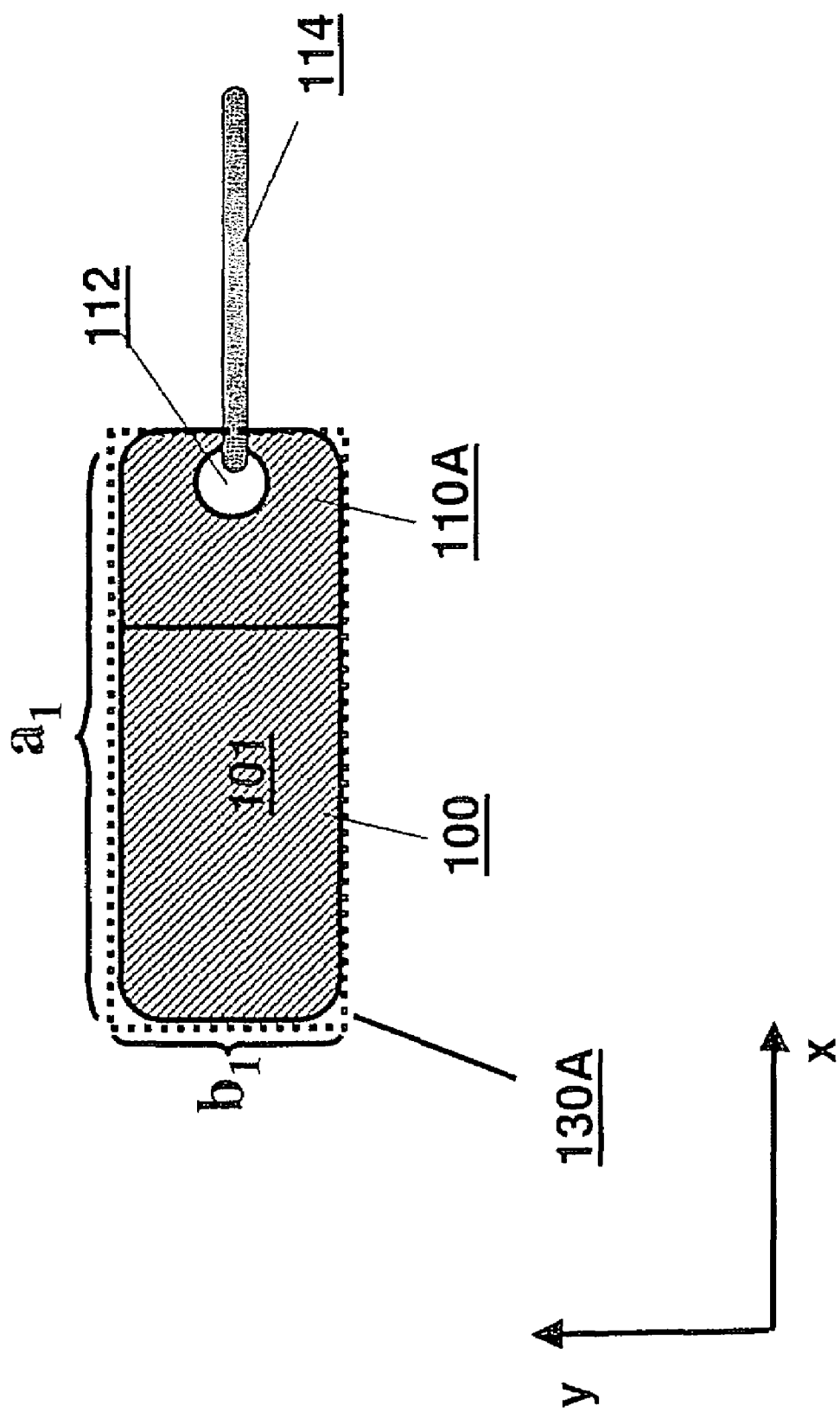
FIG. 1B provides a drawing of an electronic device attached to a device holder according to a first embodiment of the invention.

FIG. 1B provides an image of the electronic device 100 attached to the device holder 110. In the particular example of FIG. 1B, the device holder 110 functions as a cap for plug 102, although embodiments where the device holder 110 is does not function as a cap are also contemplated. Furthermore, the device holder of FIG. 1B includes a aperture 112 dimensioned to accept a key ring 114. Thus, in some embodiments, the device ring 114 is a key holder. Typically, the diameter of the aperture is at least 2 mm in diameter, and at most 25 mm in diameter. Comparing FIGS. 1A and 1B, it is noted that the device holder 110 includes a device cap portion dimensioned so as to cover plug 102.

Figure 1C:
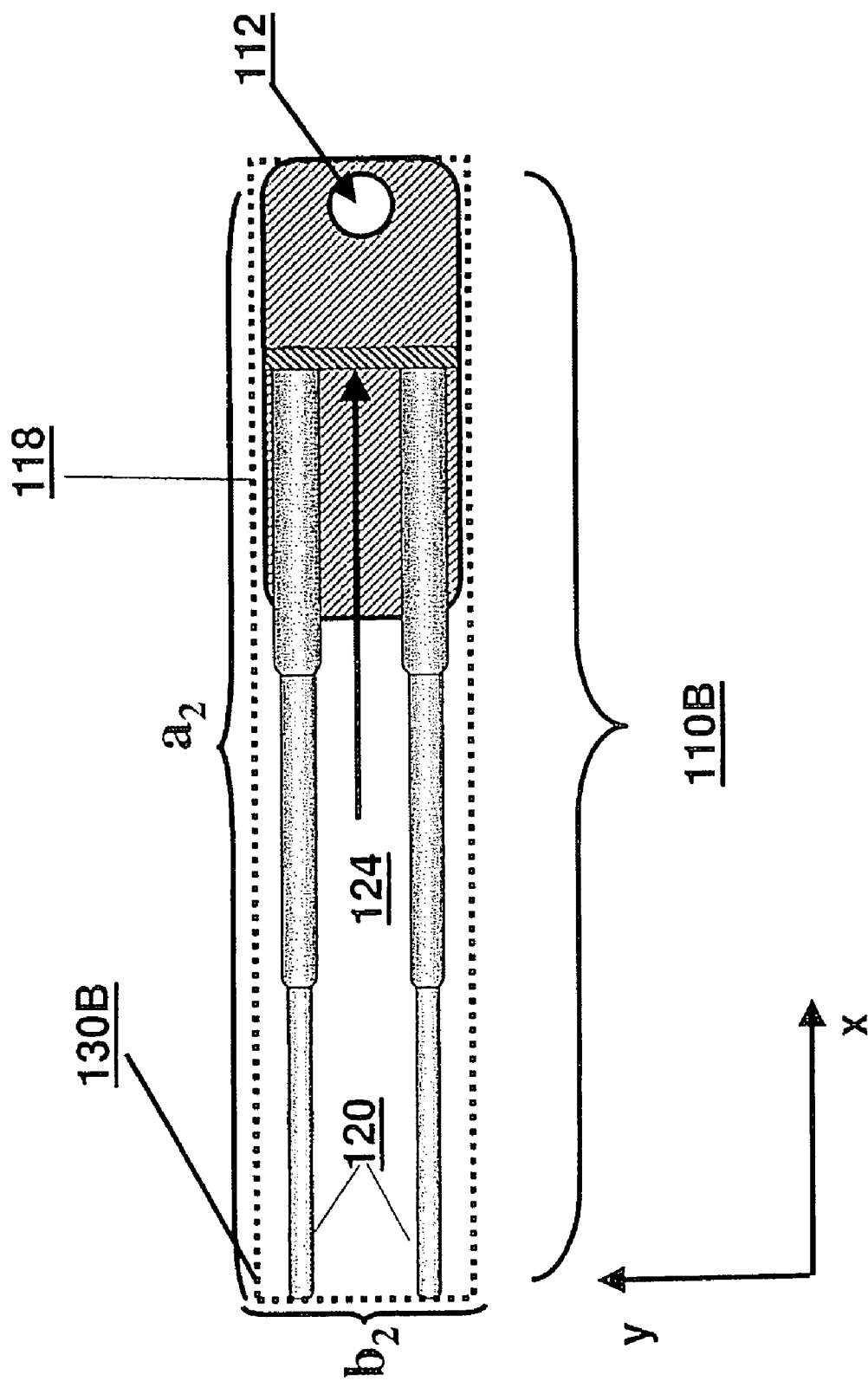
FIG. 1C provides a drawing of a device holder detached from the electronic device according to a first embodiment of the invention.

FIG. 1C provides a drawing of only the device holder 110B, i.e. without the electronic device 100. As depicted in FIG. 1C, the device holder 110B is detached from the electronic device 100. It is noted that detachment (in the example of FIGS. 1B-1C, removal of the cap portion of the device holder 110) of the electronic device causes an expansion of at least one dimension of the device holder 110.

In the particular example of FIG. 1C, the device holder 110 includes spring-loaded telescopic tubes 120 which are integrally formed with and mounted to the device holder 110 (in particular, to the base 118), and are thus considered a part of device holder 100. When the device holder 110 (in particular, the cap portion of the device holder 110) is "engaged with" or "attached to" the electronic device 100 (as in FIG. 1B)), the cap serves to restrain the spring-loaded telescoping tubes 120 from deploying as in FIG. 1C, and the telescopic tubes 120 remain within the cap portion and, thus, are not visible in FIG. 1B. When the device holder 110 and the electronic device 100 are detached from each other (i.e. when the cap is removed from the device), the spring-loaded telescopic tubes 120 are no longer restrained by the inner surface of the cap portion of the device holder 110. Because the telescopic tubes 120 are spring loaded, they are said to be "biased towards" their extended state (shown in FIG. 1C). Removal of the cap portion (one example of "disengaging" the device holder 110 from the electronic device) allows the telescopic tubes to extend full length (as they are no longer restrained by the cap), thereby causing at least one dimension (in this case, the dimension parallel to the x axis) of the device holder 110 to increase.

According to the example of FIGS. 1A-1D, in order hold the electronic device 100 to the device holder 110 (as in FIG. 1B) when attached, a snapping mechanism is provided. In particular, the device holder has a male component 124 (visible in FIGS. 1C-1D) which snaps into a female component of the electronic device 100 (not shown, located at location 103).

According to the example of FIG. 1B, when the electronic device 100 is "attached to" to the device holder 110, the device 100 is actually attached to the device holder 110. The term "attached to" relates to a situation where, irrespective of the orientation of the electronic device 100 and the device holder 110 to each other, if only one object of the electronic device 100 and the device holder 110 is held, the held object restrains the other object (i.e. the object not held) from falling, and the electronic device 100 and the device holder 110 stay together. It is noted that any mechanism for "engaging" the electronic device 100 to the device holder 110 may be provided, including but not limited to a locking mechanism, a snapping mechanism, and a frictional attachment mechanism.

Figure 1D:
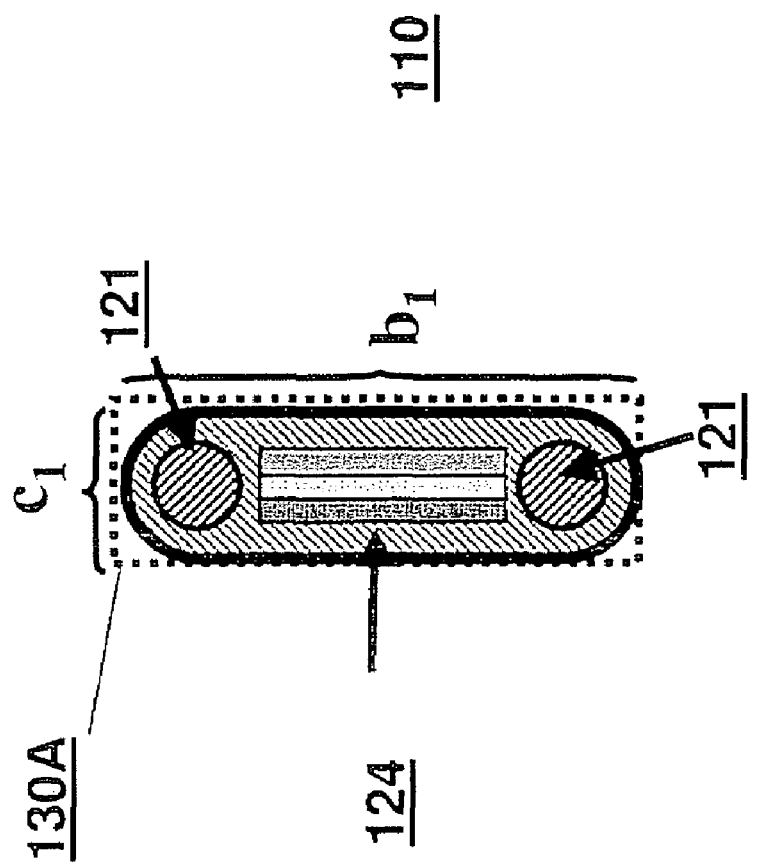
FIG. 1D provides a drawing of a cross section of a device holder according to a first embodiment of the invention.

FIG. 1D provides a cross section of the device holder 110 (i.e. detached from the electronic device 100). It is noted that when the "cap is closed" and the device holder 110 is attached to the electronic device 110, the spring-loaded telescopic tubes 120 may be stored in storage tunnels 121. It is noted that the scale of FIG. 1D differs from that of 1A-1C.

The First and Second States of the Device Holder 110

It is noted that device holder 110A has two states: a first state 110A, illustrated in FIG. 1B, and a second state 110B, illustrated in FIG. 1C. The difference between the first state 110A and the second state 110B may be explained in terms of the dimensions of two rectangular prisms, namely:

a) a first rectangular prism (a "minor" rectangular prism) (130A of FIG. 1B, shown as a dotted line, is a rectangular "slice" of the first rectangular prism in the x-y plane), which minimally circumscribes the combination of the electronic device 100 and the device holder in the first state 110, attached to (for example, attached to) the electronic device 110;

b) a second rectangular prism (a "major" rectangular prism) (130C of FIG. 1C, shown as a dotted line, is a rectangular "slice" of the second rectangular prism in the x-y plane), which minimally circumscribes the device holder 110 in the second state.

As used herein, the "minimally circumscribing" rectangular prism refers to the circumscribing rectangular prim with the minimal volume.

It is noted that when it is written that a device has "first and second states" that this is not exclusive, and that additional states are possible.

It is noted that FIGS. 1B-1C provide two-dimension views of a "slice" of the electronic device 100 and/or the device holder 110. As such, FIGS. 1B-1C do not depict the actual circumscribing rectangular prisms, but rather a rectangular slice of the rectangular circular prisms. Furthermore, it is noted that the rectangular prism 130A is a geometric construct and not a physical object.

Thus, the longest dimension of the first rectangular prism is given by $a_1$. The second longest dimension of the first rectangular prism is given by $b_1$. The third longest dimension of the first rectangular prism is given by $c_1$.

The longest dimension of the second rectangular prism is given by $a_2$. The second longest dimension of the second rectangular prism is given by $b_2$. The third longest dimension of the second rectangular prism is given by $c_2$.

For the particular example of FIGS. 1A-1D, we have $b_1=b_2$ and $c_1=c_2$, though as will be illustrated when describing other embodiments, this is not a limitation of the present invention.

Upon inspection of FIGS. 1C-1D, it is evident that $a_2 > a_1$. The present inventor believes that the user can "feel" that the device holder is, at least in one dimension, "expanded" when in the second state relative to the first state. This could reduce the likelihood that the user, after removing the electronic device from the device holder and using the electronic device 100 for a period of time, will forget to return the electronic device 100 to its holder.

This is the case, for example, because the device holder 110, due to the expanded dimension or dimensions, may be more difficult to place in a user's pocket when in the second state (i.e. when detached from the electronic device 100), than, for example, the combination of the electronic device 100 and the device holder 110 in the first state. Thus, in the second state, due to the erected telescopes 120, it may be difficult to place the device holder 110 in the pocket and forget it.

Thus, in some embodiments, the ratio $$\left(\text{i.e. } \frac{a_2}{a_1}\right)$$

between the longest dimension of the second rectangular prism and the longest dimension of the first rectangular prism must be at least a "first value." In different embodiments, this "first value" may be 1.5, 1.7, 1.9 or 2.

Figure 2A:
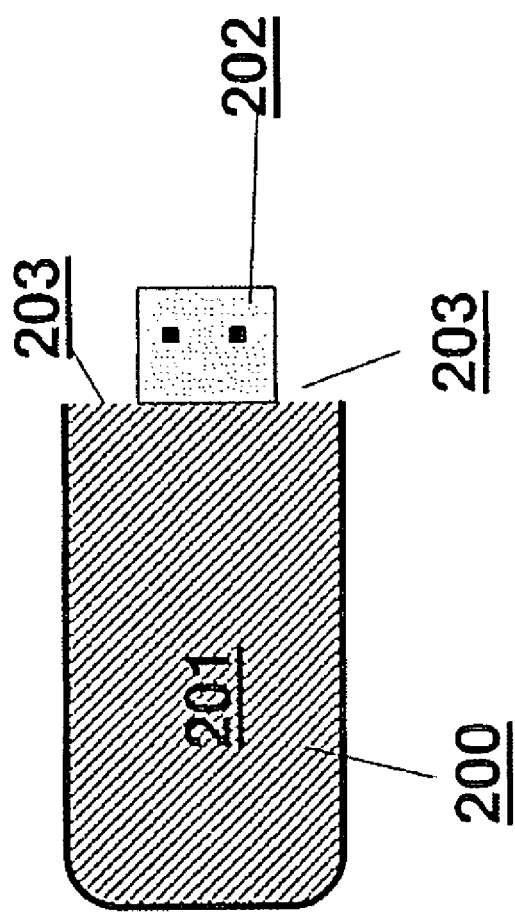
FIG. 2A provides a drawing of an electronic device according to a second embodiment of the invention.
Figure 2A:
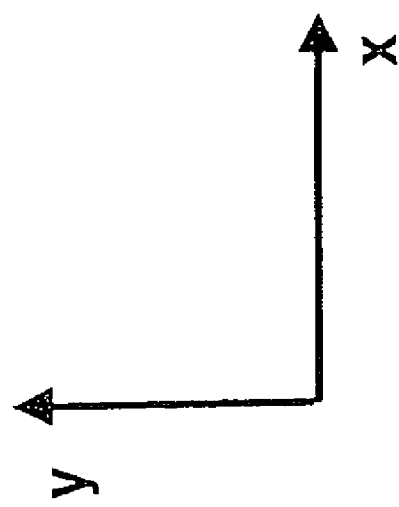
Figure 2B:
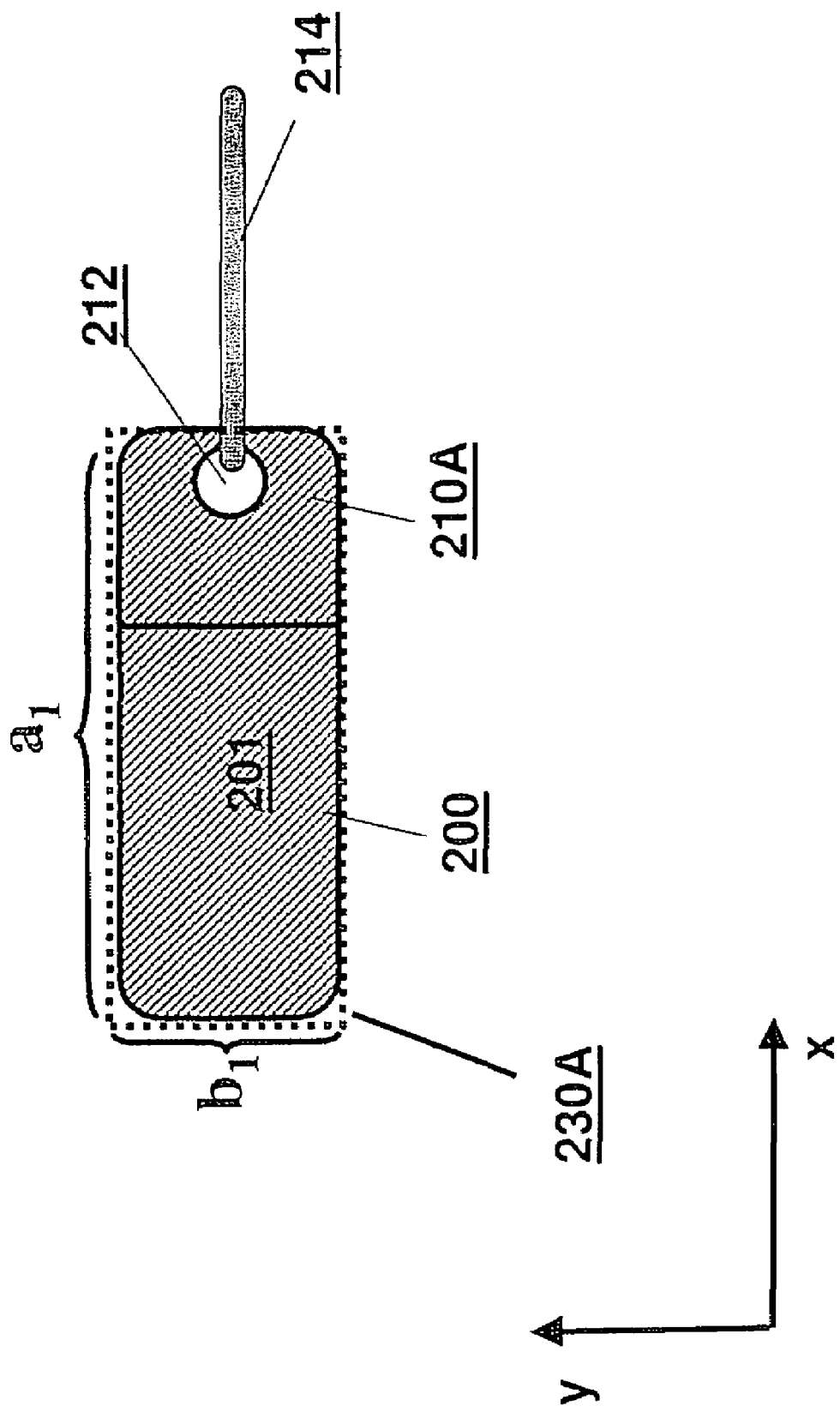
FIG. 2B provides a drawing of an electronic device attached to a device holder according to a second embodiment of the invention.
Figure 2C:
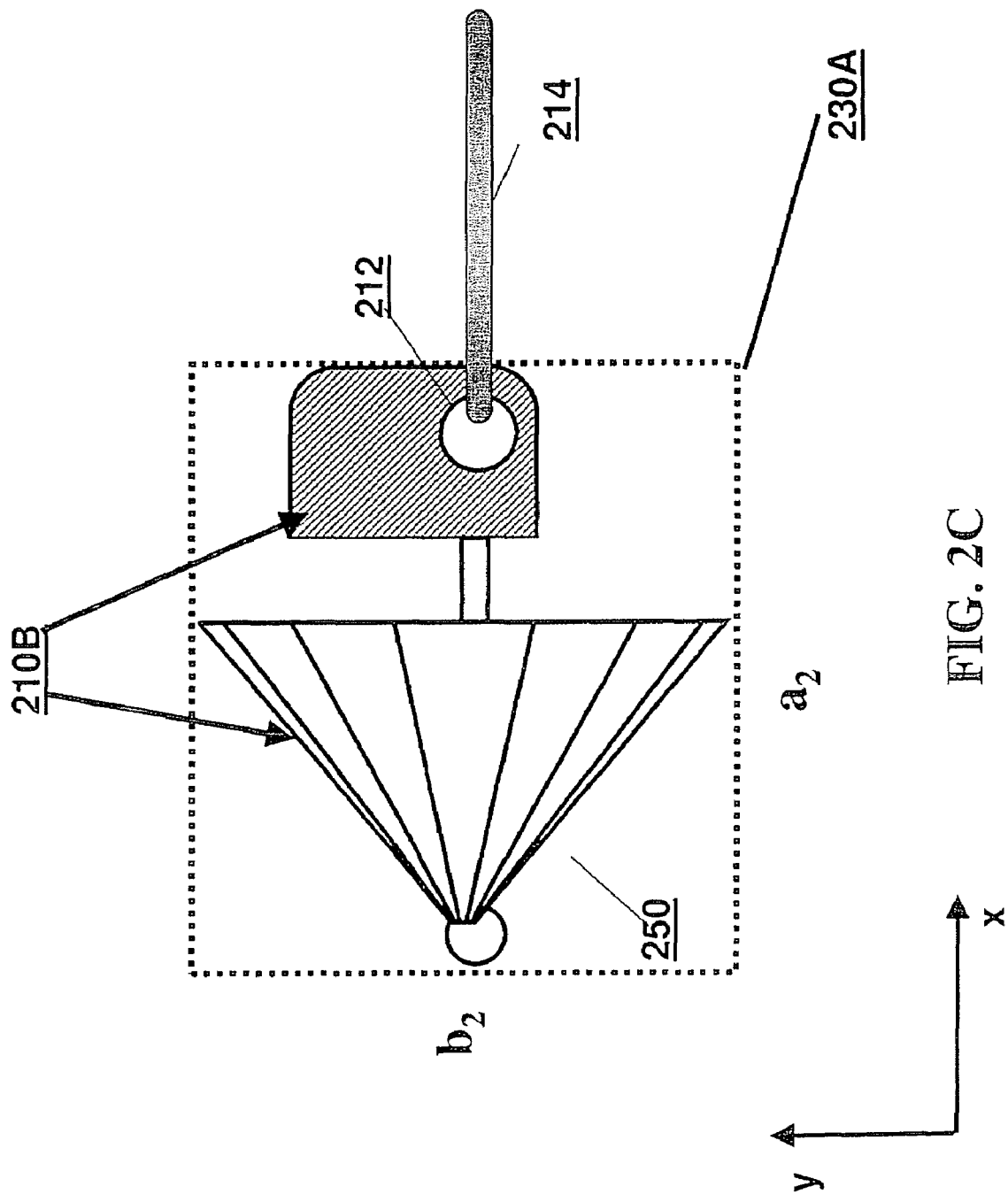
FIG. 2C provides a drawing of a device holder detached from the electronic device according to a first variation of a second embodiment of the invention.

It is noted in FIG. 1C that $$\frac{a_2}{a_1} > 1,$$

though this is not a requirement of the present invention (see FIG. 2C).

Transition Between First and Second States of the Device Holder 110

It is noted detachment of the electronic device 100 and the device holder 110 from each other is operative to cause the device holder to adopt the second state (i.e. shown in FIG. 1C). This causation may be "indirect," for example as shown in FIGS. 1B-1C. According to the example of FIG. 1B, the device holder is biased towards the second state (i.e. with the telescopic tubes 120 extended as in FIG. 1C), and the presence of the cap (i.e. the attachment of the device holder 110 to the electronic device 100) is operative to retain (or "temporarily" retain—i.e. as long as the device holder 110 is attached to the electronic device 100) the device holder 110 in the "first state." Removal or detachment of the device holder 100 eliminates any obstacle preventing the device from adopting the second state (in the example of FIGS. 1A-1D, the obstacle is surface of the electronic device which prevents the spring loaded telescopic tubes 120 from expanding).

It is not a requirement of the present invention for the device holder 110 to be biased to the second state, and, alternatively or additionally, there may be other, mechanisms (for example, "direct mechanism") operative to cause the device to adopt the second state upon detachment of the device holder. In one example, a gear assembly is provided and detachment of the device holder 110 from the electronic device is operative to move a gear which in turn brings the device holder 110 to the second state.

It is noted that when the user finished with the electronic device 100 and wishes to "return the cap," she simply "pushes down" on the telescopic tubes until they are un-extended (for example, with a surface of the electronic device 100), and re-attached or re-engages (for example, using the snapping mechanism) the electronic device 100 to the device holder 110. This will return the device holder to its first state.

A Description of a Second Embodiment

According to a second exemplary embodiment (with reference to FIG. 2A) an electronic device 200 is provided, which is similar to the electronic device 100 of the first embodiment (including housing 201 and a plug 202, and a male piece of a snapping mechanism (not shown) located at 203.

FIG. 2B provides an image of the device holder 210 in the "first state" 210A attached to the device. The device holder 210 in the example of FIG. 2B (similar to the example of FIG. 1B), is a key holder with an aperture 212 for a key-ring. Furthermore, the device holder 210 also functions as a cap for the plug 202. In the first state of FIG. 2C, the minimal circumscribing rectangular prism 230A of the combination of the attached electronic device 200 and the device holder 210 in the first state 210A has a longest dimension of $a_1$, a second longest dimension of $b_1$, and a third longest dimension of $c_1$.

Referring now to FIG. 2C, it is noted that detachment of the device holder 210 from the electronic device is operative to cause the device holder 210 to adopt a second state 210B. In the second state of FIG. 2C, the minimal circumscribing rectangular prism 230B of the device holder 210 in the second state 210B has a longest dimension of $a_2$, a second longest dimension of $b_2$, and a third longest dimension of $c_2$.

One salient feature of the embodiment shown in FIG. 2C is that $b_1 \neq b_2$ and $c_1 \neq c_2$. In particular, $b_1 > b_2$ and $c_1 > c_2$. Although $a_2$ happens to exceed $a_1$ in FIG. 2C, this is not a requirement of the present invention, and embodiments wherein $a_1=a_2$ or wherein $a_1<a_2$ are also contemplated by the present inventor.

In some embodiments, the combination of the following conditions is true:

$$\frac{a_2 \cdot b_2}{a_1 \cdot b_1}$$

exceeds a "second value", while $$\frac{b_2}{a_2}$$

simultaneously exceeds a "third value."

In exemplary embodiments, the "second value" may be at least 1.5, 1.7, 1.9 or 2. In exemplary embodiments, the "third value" may be at least 0.2, 0.3, 0.5 or 0.7.

It is noted the ratio $$\frac{b_2}{a_2}$$

may provide a metric for how "significant" the second longest dimension of the minimal circumscribing rectangular prism is. What the aforementioned condition says is at follows: if the second longest dimension is "significant" (i.e. if the ratio $$\frac{b_2}{a_2}$$

exceeds the third value), then it may be possible to "make the second state noticeably different" to the user so the user does not "forget" the electronic device 100, by arranging the second state such that $$\frac{a_2 \cdot b_2}{a_1 \cdot b_1}$$

exceeds a certain number.

In some embodiments, the combination of the following conditions is true:

$$\frac{a_2 \cdot b_2 \cdot c_2}{a_1 \cdot b_1 \cdot c_1}$$

exceeds a "fourth value", while $$\frac{c_2}{a_2}$$

simultaneously exceeds a "fifth value."

In exemplary embodiments, the "fourth value" may be at least 1.5, 1.7, 1.9 or 2. In exemplary embodiments, the "fifth value" may be at least 0.2, 0.3, 0.5 or 0.7.

Figure 2D:
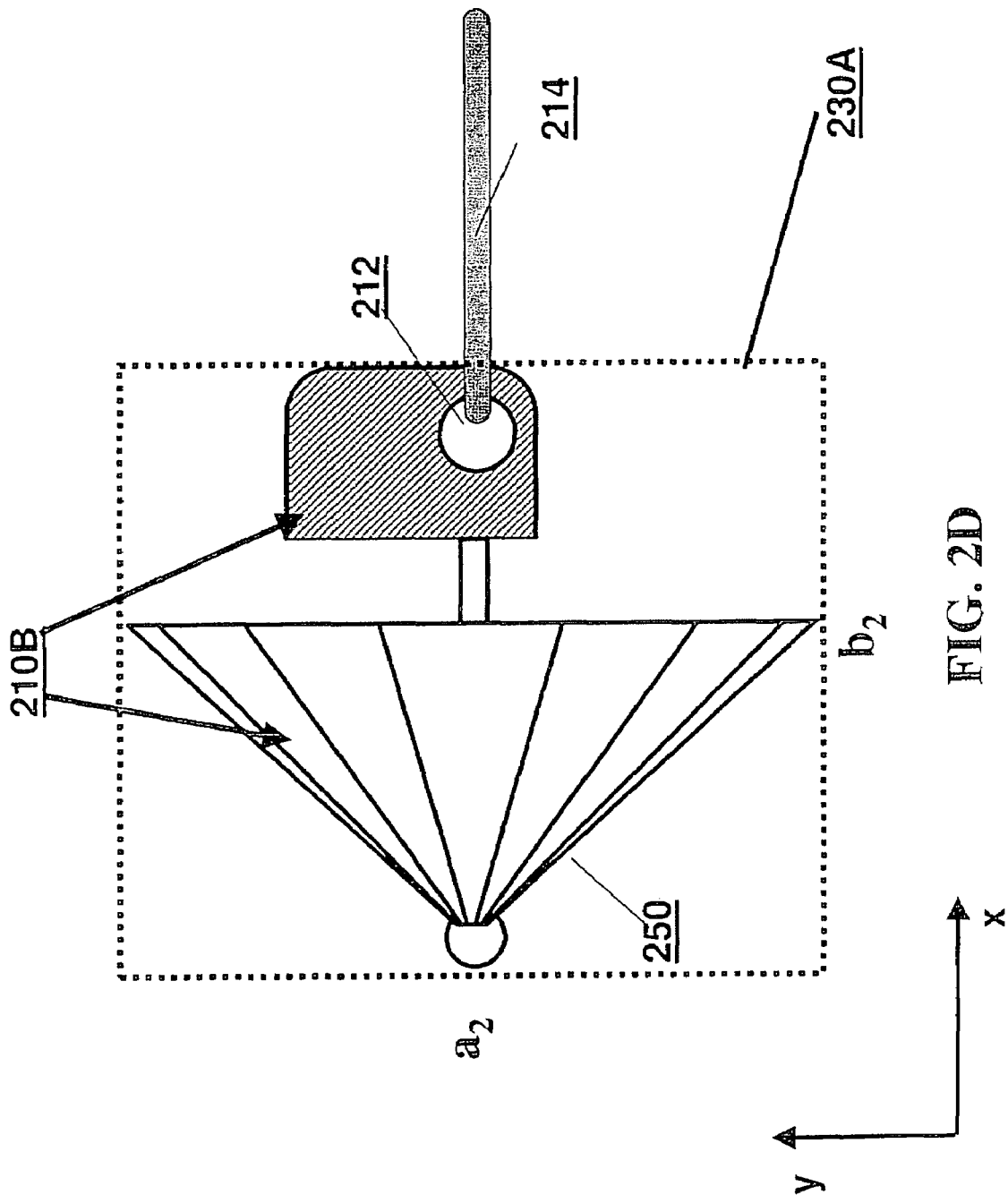
FIG. 2) provides a drawing of a device holder detached from the electronic device according to a second variation of a second embodiment of the invention.
FIG. 2E provides a drawing of a cross section of a device holder according to a second embodiment of the invention.

FIG. 2D provides a variation of the second embodiment nowhere the "umbrella" has slightly different dimensions from those of FIG. 2C.

Figure 2E:
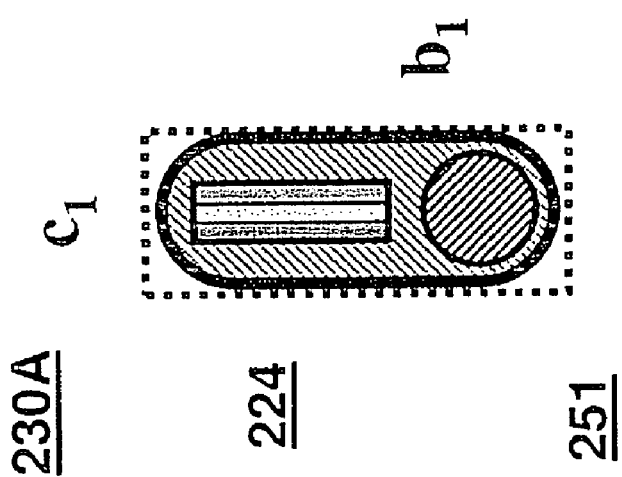

It is noted in FIG. 2E that there is only one "tunnel" 251 for storing the "cocktail umbrella 250 before deployment. As in the case of the first embodiment, in some embodiments in accordance with FIG. 2, the cocktail umbrella 250 is provided with a spring-like mechanism which biases the cocktail umbrella toward deployment, and the device holder 210 towards the "second state," though this is not a limitation or requirement.

Third Embodiment

Figure 3A:
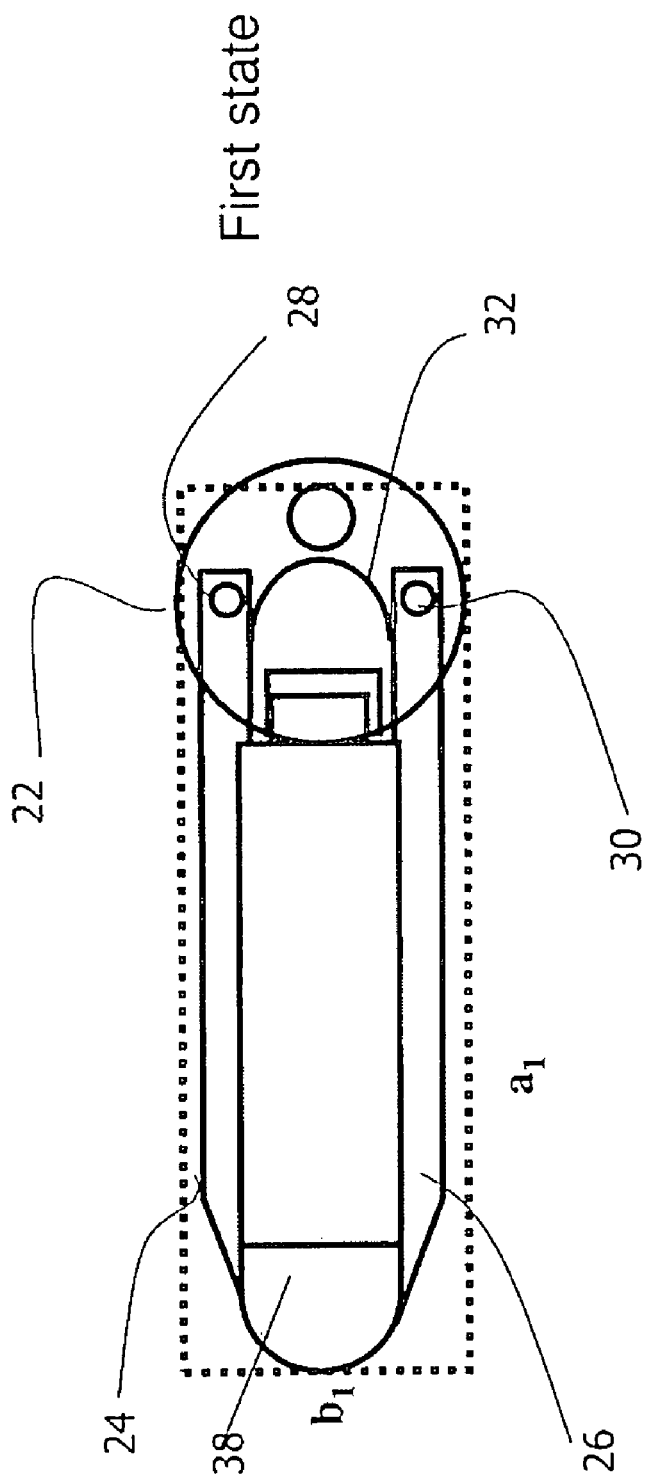
FIGS. 3A-3D provide images in accordance with a third embodiment of the invention.
Figure 3B:
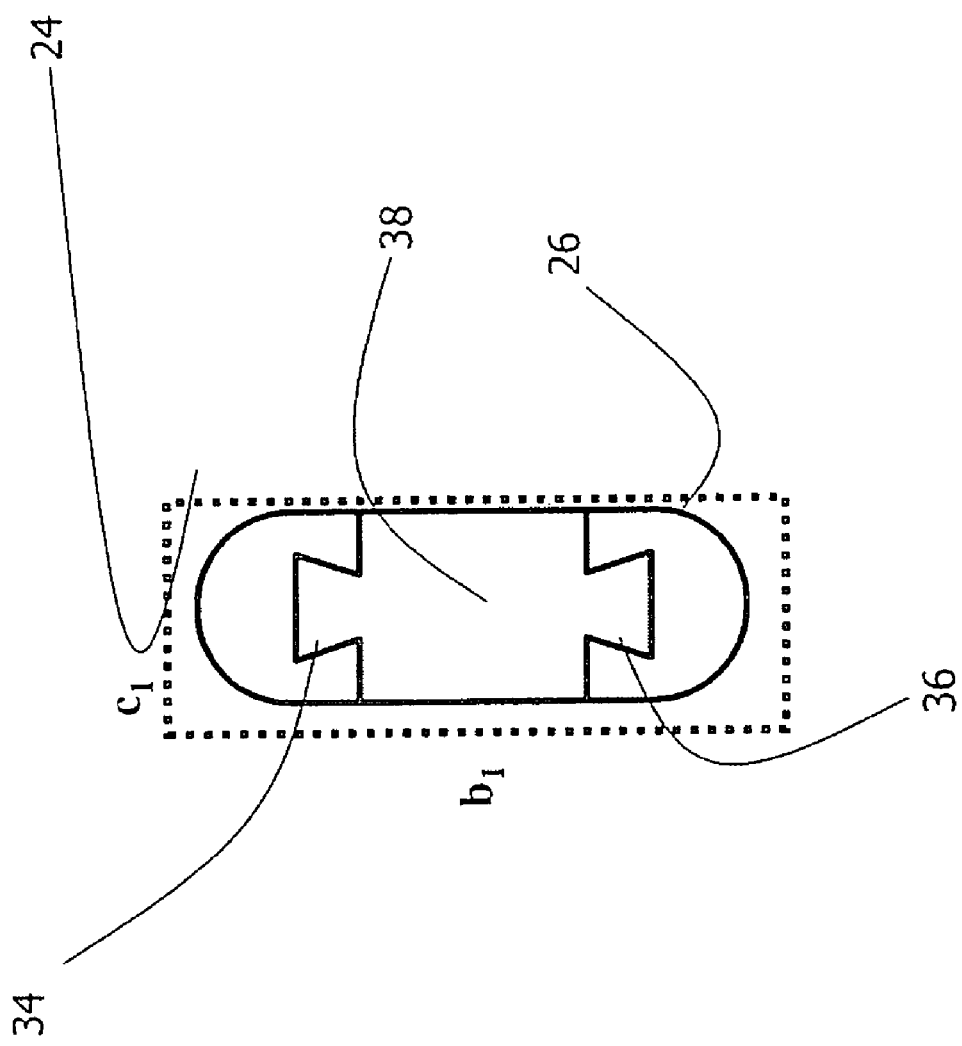
Figure 3C:
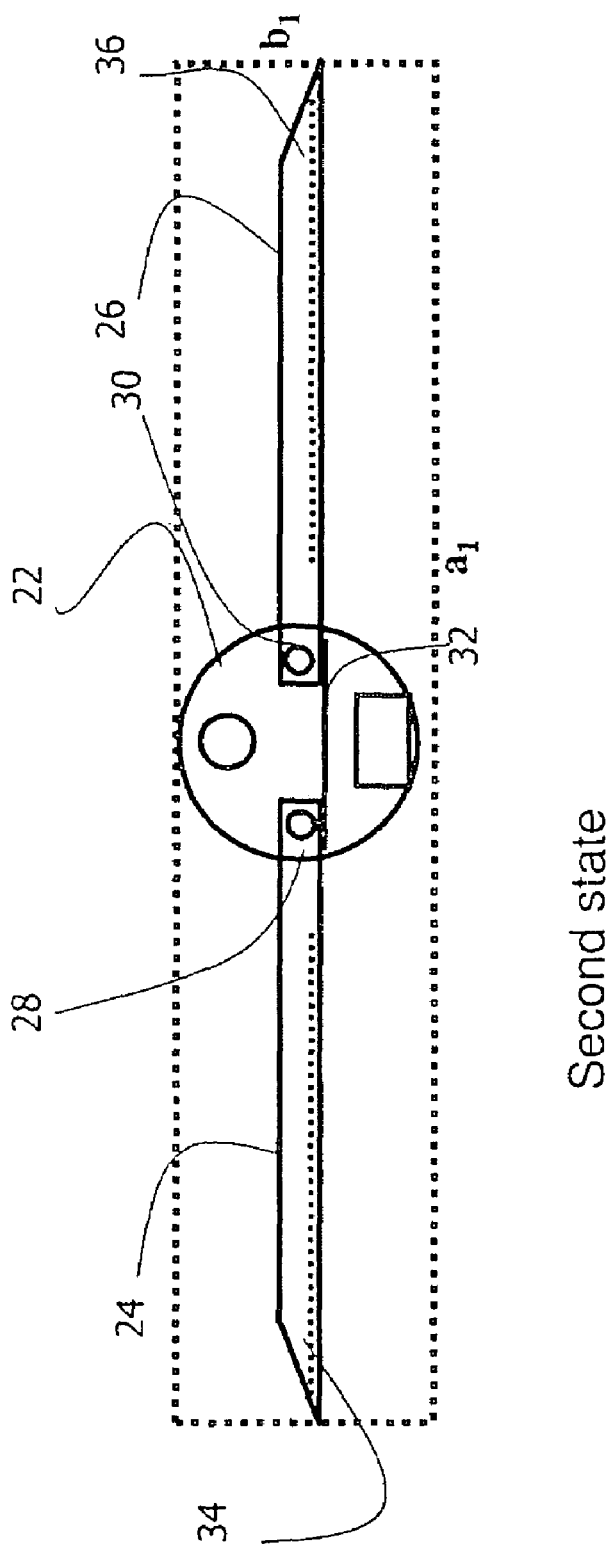
Figure 3D:
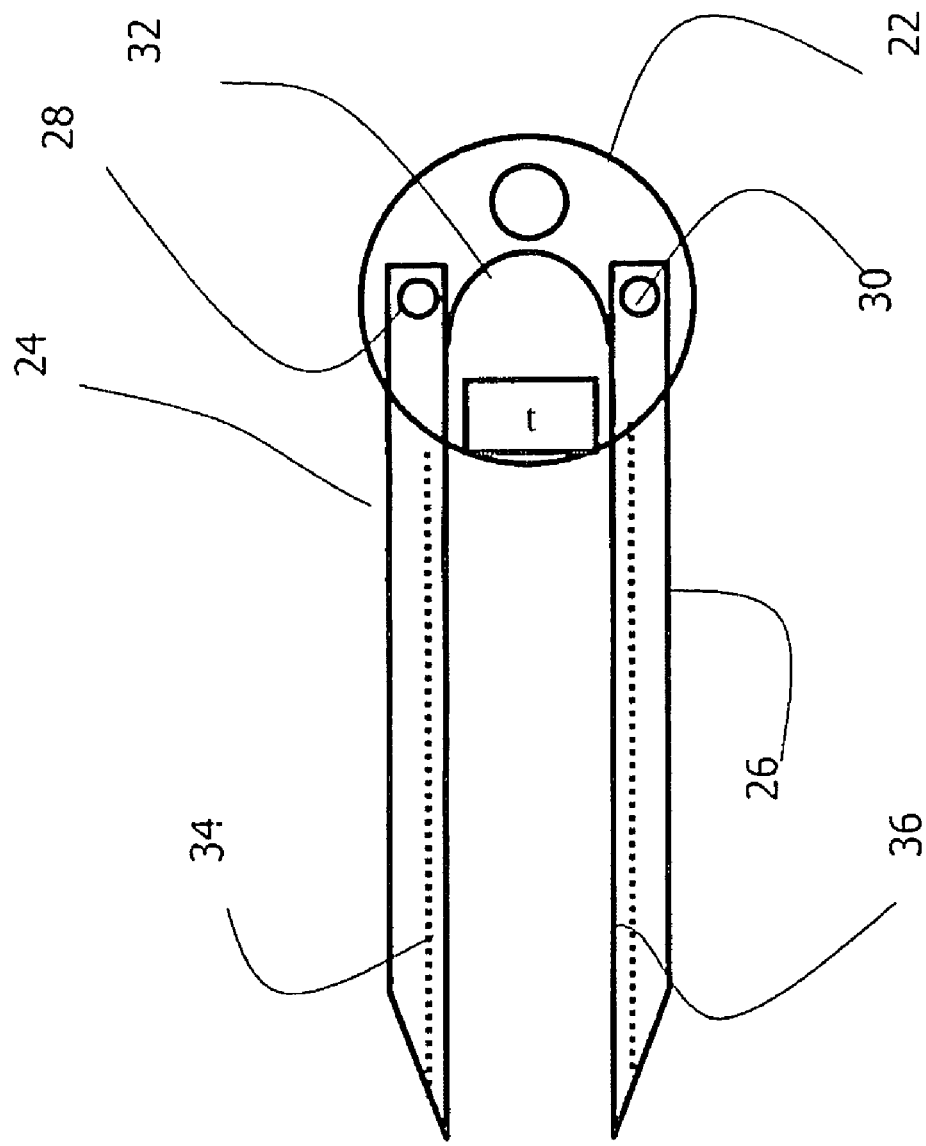

According to some embodiments (for example, those in FIGS. 3A-3D), the device holder includes a central part 22 and two oppositely hinged arms (24 and 26). FIG. 3A show the device holder in the "first state" with the circumscribed rectangular prism. The attachment of the electronic device 38 to the device holder serves to retain the device holder in the first state. FIG. 3C shows the device holder detached from the electronic device.

The inner surfaces 34 and 36 of the hinged arms 24 and 26 each includes dove-tail ridges, and the housing of the electronic device 38 also includes dove-tail ridges. These dovetailed ridges serve to keep the device 38 attached to the device container (in particular to hinged arms 24 and 26).

As shown in FIG. 3C, the device holder includes a spring 34 which biases the device holder towards the second state. Thus, upon removal or disengagement or detachment of the electronic device 38, the spring causes the device holder to adopt the "second state."

A Fourth Embodiment

According to some embodiment, the device holder has a receptacle (for example, a female plug) dimensioned to accept the electronic device plug (for example, a USB plug). In particular embodiments, insertion of the device plug into the receptacle is operative to cause the device holder to adopt the "first state," while removal of the device plug from the receptacle is operative to cause the device to adopt the "second state."

A Discussion of a Device Holder Transition Between the "Convenient State" and the "Inconvenient State" in Terms of a Ratio Between a Maximum Localized Contact Pressure in the Inconvenient State to the Maximum Localized Contact Pressure in the Convenient State The aforementioned discussion of relative sizes (i.e. relative sizes of minimally circumscribing rectangular prisms) provides one possible description of the difference between the "convenient state" of the device holder and the "inconvenient state" of the device holder.

Alternatively or additionally, the difference between the "convenient state" of the device holder and the "inconvenient state" of the device holder may be defined in terms of the maximum localized contact pressure of the device holder. More specifically, according to some embodiments, a ratio between a maximum localized contact pressure of the device holder when in the inconvenient state and a maximum contact localized pressure of the device holder when in the convenient state is at least a pre-determined value, for example, at least 2, for example, at least 5, for example, at least 10. For the purposes of calculating the ratio, the term "maximum localized contact pressure" may be defined as the maximum localized contact pressure generated by the portable object holder (for example, the electronic device holder) when urged with a fixed force against a flat region of a skin membrane covered with a thin fabric (for example, of a thickness typically used in pants pockets).

Typically, this increased maximum localized contact pressure (which makes the device holder inconvenient to carry in a user's pocket) may be provided by one or more localized projections or spike (for example, a sharp edge or a sharp point, for example, telescopic tubes 120 of FIG. 1C) which, in the inconvenient state, are operative to provide the requisite maximum localized contact pressure in reaction to an opposing force (i.e. to satisfy the "ratio" definition above). There is no limitation on the size of this projection or spike, and the spike may be a "long spike" or may be one or more shorter spikes or even "very short spikes" (for example, whose length is less than 10% of the longest dimension of the device holder). The configuration and/or presence of the spikes or localized projections in the inconvenient state may be operative to make the device holder inconvenient to place in a user's pocket when the device holder is in the inconvenient state.

In the description and claims of the present application, each of the verbs, "comprise" "include" and "have", and conjugates thereof are used to indicate that the object or objects of the verb are not necessarily a complete listing of members, components, elements or parts of the subject or subjects of the verb.

All references cited herein are incorporated by reference in their entirety. Citation of a reference does not constitute an admission that the reference is prior art.

The articles "a" and "an" are used herein to refer to one or to more than one (i.e., to at least one) of the grammatical object of the article. By way of example, "an element" means one element or more than one element.

The term "including" is used herein to mean, and is used interchangeably with, the phrase "including but not limited" to.

The term "or" is used herein to mean, and is used interchangeably with, the term "and/or," unless context clearly indicates otherwise.

The term "such as" is used herein to mean, and is used interchangeably, with the phrase "such as but not limited to".

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

What is claimed is:

1. A system comprising:
   a) an electronic device having electronic circuitry and a housing;
   b) a device holder having first and second states, wherein:
      i) said electronic device is reversibly attachable with said device holder;
      ii) said device holder is retained in said first state when attached with said electronic device;
      iii) detachment of said electronic device from said device holder is operative to cause said device holder to adopt said second state; and
      iv) at least one of a first size relation, a second size relation and a third size relation between a first rectangular prism and a second rectangular prism is true, wherein said rectangular prisms are defined as follows:
         A) said first rectangular prism minimally circumscribing the combination of said electronic device and said device holder in said first state while said device is attached to said electronic device,
         B) said second rectangular prism minimally circumscribing said device holder in said second state and wherein said size relations are defined as follows:
            I) according to said first size relation, a ratio between a longest dimension of said second rectangular prism and a longest dimension of said first rectangular prism is at least a first value that is at least 1.5; and
            II) according to said second size relation, a ratio between a product of the two longer dimensions of said second rectangular prism and a product of the two longer dimensions of said first rectangular prism is at least a second value that is at least 1.5, and a ratio between a second longest dimension of said second rectangular prism and a longest dimension of said second rectangular prism is at least a third value that is at least 0.3; and
            III) according to said third size relation, a ratio between a volume of said second rectangular prism and a volume of said first rectangular prism is at least a fourth value that is at least 1.5, and a ratio between a shortest dimension of said second rectangular prism and a longest dimension of said second rectangular prism is at least a fifth value that is at least 0.3.

2. The system of claim 1 wherein said electronic device is a flash memory drive.

3. The system of claim 2 wherein said flash memory drive is a USB flash drive.

4. The system of claim 1 wherein at least one of said first value, said third value and said fifth value is 1.7.

5. The system of claim 1 wherein at least one of said first value, said third value and said fifth value is 1.9.

6. The system of claim 1 wherein at least one of said first value, said third value and said fifth value is 2.

7. The system of claim 1 wherein at least one of said second value and said fourth value is 0.5.

8. The system of claim 1 wherein at least one of said second value and said fourth value is 0.7.

9. The system of claim 1 wherein said device holder is biased towards said second state, and said device holder is temporarily retained in said first state while attached to said electronic device.

10. The system of claim 1 wherein said electronic device has a plug.

11. The system of claim 10 wherein said device holder is dimensioned as a cap for said plug.

12. The system of claim 10 wherein said plug is a USB plug.

13. The system of claim 12 wherein said electronic device is a USB flash device.

14. The system of claim 1 wherein said device holder includes an aperture dimensioned to accept a key ring.

15. The system of claim 10 wherein said device holder has a receptacle dimensioned to accept said plug.

16. The system of claim 15 wherein insertion of said plug into said receptacle is operative to cause said device holder to adopt said first state, and removal of said plug from said receptacle is operative to cause said device holder to adopt said second state.

17. A system comprising:
a) a portable object;
b) a portable object holder having first and second states, wherein:
   i) said portable object is reversibly attachable with said portable object holder;
   ii) said portable object holder is retained in said first state when attached with said portable object;
   iii) detachment of said portable object from said portable object holder is operative to cause said portable object holder to adopt said second state; and
   iv) at least one of a first size relation, a second size relation and a third size relation between a first rectangular prism and a second rectangular prism is true, wherein said rectangular prisms are defined as follows:
      A) said first rectangular prism minimally circumscribing the combination of said portable object and said portable object holder in said first state while said device is attached to said portable object,
      B) said second rectangular prism minimally circumscribing said portable object holder in said second state and wherein said size relations are defined as follows:
         I) according to said first size relation, a ratio between a longest dimension of said second rectangular prism and a longest dimension of said first rectangular prism is at least a first value that is at least 1.5; and
         II) according to said second size relation, a ratio between a product of the two longer dimensions of said second rectangular prism and a product of the two longer dimensions of said first rectangular prism is at least a second value that is at least 1.5, and a ratio between a second longest dimension of said second rectangular prism and a longest dimension of said second rectangular prism is at least a third value that is at least 0.3; and
         III) according to said third size relation, a ratio between a volume of said second rectangular prism and a volume of said first rectangular prism is at least a fourth value that is at least 1.5, and a ratio between a shortest dimension of said second rectangular prism and a longest dimension of said second rectangular prism is at least a fifth value that is at least 0.3.

18. A system, comprising:
an electronic device having electronic circuitry; and
a device holder reversibly attachable with the electronic device, the device holder having first and second states, the device holder has a first set of dimensions in the first state, the device holder has a second set of dimensions in the second state, the first set of dimensions is different than the second set of dimensions, the device holder is retained in the first state when attached to the electronic device, the device holder transitions to the second state when detached from the electronic device, the second set of dimensions includes at least one dimension that is larger than a corresponding dimension in the first set of dimensions.

19. The system of claim 18, wherein:
the device holder has a first shape in the first state; and
the device holder has a second shape in the second state, the first shape is different than the second shape.

20. The system of claim 18, wherein:
the first set of dimensions includes three dimensions;
the second set of dimensions includes three dimensions; and
all three dimensions of the first set of dimensions differs from corresponding dimensions of the second set of dimensions.

21. The system of claim 18, wherein:
the device holder includes a spring-loaded telescopic tube;
in the first state, the spring-loaded telescopic tube is completely inside the device holder; and
in the second state, the spring-loaded telescopic tube extends outside the device holder.

22. The system of claim 18, wherein:
the device holder includes an umbrella shaped device;
in the first state, the umbrella shaped device is closed; and
in the second state, the umbrella shaped device is open.

23. The system of claim 18, wherein:
the device holder includes an arm;
in the first state, the arm is retracted; and
in the second state, the arm is extended.

24. The system of claim 18, further comprising:
a snapping mechanism to hold the electronic device to the device holder.

25. The system of claim 24, wherein:
the snapping mechanism includes a male component on the device holder and a female component on the electronic device.

26. The system of claim 18, wherein:
the device holder provides a first maximum localized contact pressure when in the first state;
the device holder provides a second maximum localized contact pressure when in the second state; and
the ratio of the second maximum localized contact pressure to the first maximum localized contact pressure is at least two.

27. The system of claim 18, wherein:
the first set of dimensions has only one dimension different than the second set of dimensions.

* * * * *

UNITED STATES PATENT AND TRADEMARK OFFICE
CERTIFICATE OF CORRECTION

PATENT NO. : 7,630,204 B2
APPLICATION NO. : 11/389224
DATED : December 8, 2009
INVENTOR(S) : Itzhak Pomerantz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 926 days.

Signed and Sealed this

Second Day of November, 2010

David J. Kappos
*Director of the United States Patent and Trademark Office*